US008600550B2

(12) United States Patent
Kurzweil

(10) Patent No.: US 8,600,550 B2
(45) Date of Patent: Dec. 3, 2013

(54) VIRTUAL ENCOUNTERS

(75) Inventor: Raymond C. Kurzweil, Newton, MA (US)

(73) Assignee: Kurzweil Technologies, Inc., Wellesley Hills, MA (US)

( * ) Notice: Subject to any disclaimer, the term of this patent is extended or adjusted under 35 U.S.C. 154(b) by 2310 days.

(21) Appl. No.: 10/734,617

(22) Filed: Dec. 12, 2003

(65) Prior Publication Data

US 2005/0131580 A1 Jun. 16, 2005

(51) Int. Cl.
*G06F 19/00* (2011.01)

(52) U.S. Cl.
USPC .......... 700/245; 700/70; 700/78; 700/83; 318/561; 318/568.11; 318/568.12; 345/156; 345/158; 345/163; 345/418; 345/419; 180/8.1; 180/8.6

(58) Field of Classification Search
USPC .......... 700/245, 70, 78, 83; 706/1; 348/14.01; 463/30; 345/7, 8, 9, 32, 156, 158, 163, 345/418, 419, 420, 421, 427, 428, 473, 474, 345/619, 632; 715/757, 848, 850, 856; 318/561, 568.11, 568.12, 601; 359/368, 630; 180/8.1, 8.6; 709/201, 709/204, 206; 382/293; 600/38
See application file for complete search history.

(56) References Cited

U.S. PATENT DOCUMENTS

| | | | |
|---|---|---|---|
| 1,813,371 A * | 7/1931 | Whatmough | 106/402 |
| 5,659,691 A | 8/1997 | Durward et al. | |
| 5,889,672 A | 3/1999 | Schuler et al. | |
| 6,005,548 A | 12/1999 | Latypov et al. | |
| 6,016,385 A | 1/2000 | Yee et al. | |
| 6,064,749 A * | 5/2000 | Hirota et al. | 382/103 |
| 6,275,213 B1 | 8/2001 | Tremblay et al. | |
| 6,695,770 B1 | 2/2004 | Choy et al. | |
| 6,786,863 B2 | 9/2004 | Abbasi | |
| 6,832,132 B2 * | 12/2004 | Ishida et al. | 700/245 |
| 7,046,151 B2 | 5/2006 | Dundon | |
| 7,099,747 B2 * | 8/2006 | Mikami et al. | 700/245 |
| 7,164,969 B2 * | 1/2007 | Wang et al. | 700/245 |
| 7,164,970 B2 * | 1/2007 | Wang et al. | 700/245 |

(Continued)

FOREIGN PATENT DOCUMENTS

WO WO00/59581 10/2000

OTHER PUBLICATIONS

Hasunuma et al., Development of Teleportation Master System with a Kinesthetic Sensation of Presence, 1999, Internet, p. 1-7.*

(Continued)

*Primary Examiner* — McDieunel Marc
(74) *Attorney, Agent, or Firm* — Fish & Richardson P.C.

(57) ABSTRACT

A virtual reality encounter system includes motion sensors positioned on a human user. The motion sensors send motion signals corresponding to movements of the user as detected by the motion sensors relative to a reference point, the motion signals are transmitted over a communications network. The system also includes a humanoid robot, receiving, from the communications network, the motion signals to induce movement of the robot according to movement of the human user.

29 Claims, 10 Drawing Sheets

(56) References Cited

U.S. PATENT DOCUMENTS

| | | | |
|---|---|---|---|
| 2002/0049566 A1* | 4/2002 | Friedrich et al. | 702/188 |
| 2002/0116352 A1 | 8/2002 | Kilgard et al. | |
| 2003/0093248 A1* | 5/2003 | Vock et al. | 702/188 |
| 2003/0229419 A1* | 12/2003 | Ishida et al. | 700/245 |
| 2005/0027794 A1 | 2/2005 | Decker | |
| 2005/0130108 A1 | 6/2005 | Kurzweil | |
| 2005/0131580 A1 | 6/2005 | Kurzweil | |
| 2005/0131846 A1* | 6/2005 | Kurzweil | 706/1 |
| 2005/0140776 A1* | 6/2005 | Kurzweil | 348/14.01 |
| 2005/0143172 A1* | 6/2005 | Kurzweil | 463/30 |

OTHER PUBLICATIONS

Kanehiro et al., Virtual Humanoid Robot Platfrom to Develop Controllers of Real Humanoid Robots without Porting, 2001, IEEE, p. 1093-1099.*

Hou et al., Teleoperation Characteristics and Human Response Factor in Relation of A Robotic Welding System, 1996, IEEE, p. 1195-1202.*

Kalra et al., Real-Time Animation of Realistic Virtual Humans, 198, IEEE, p. 42-56.*

* cited by examiner

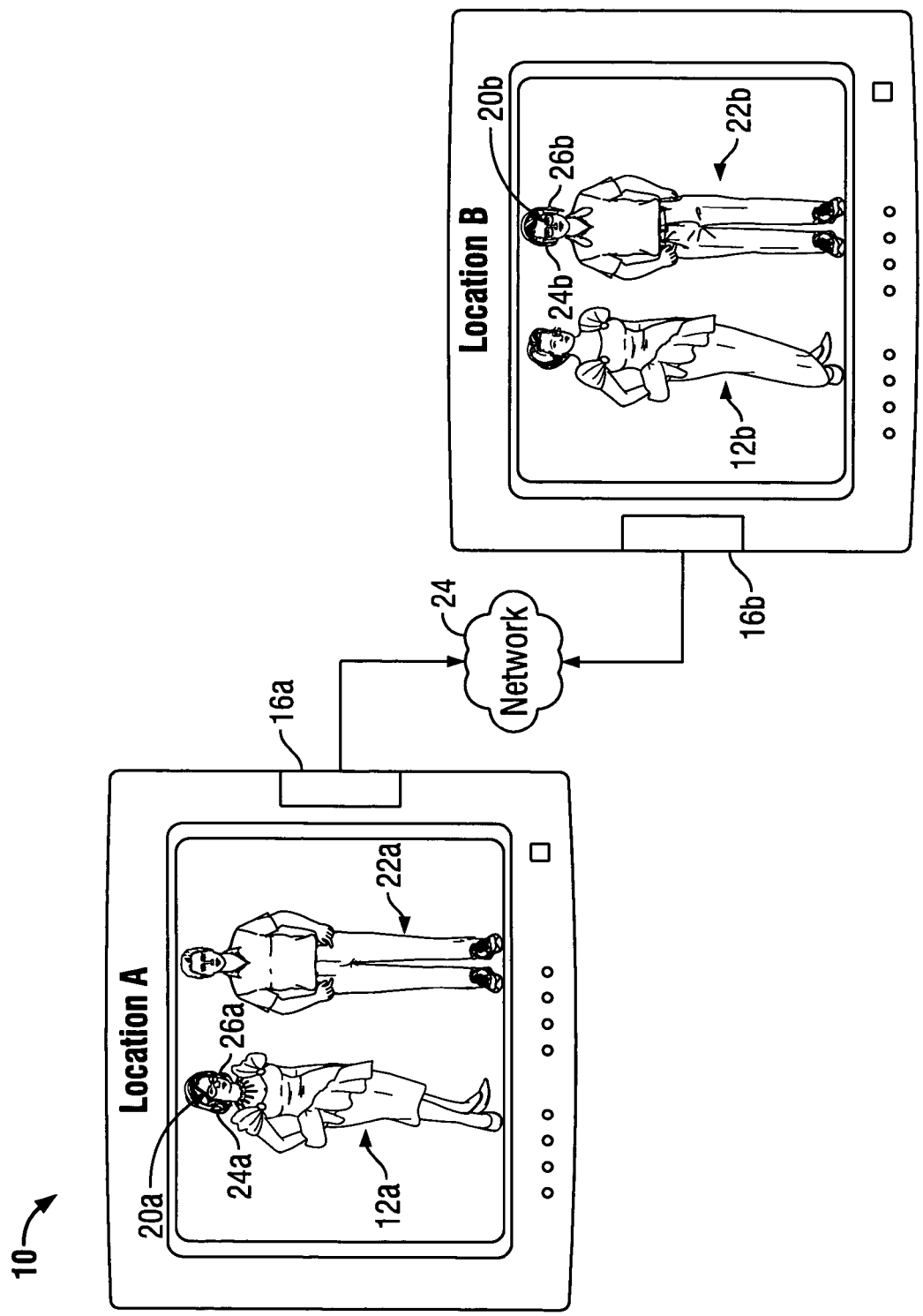

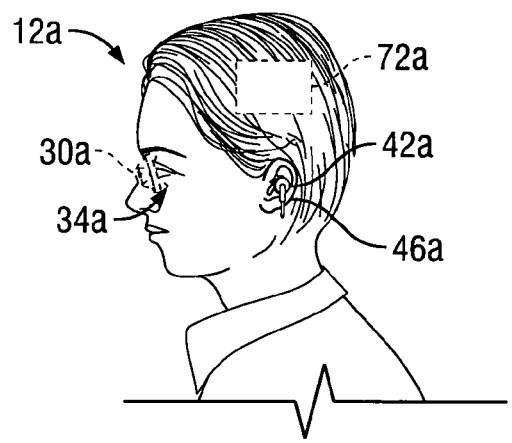
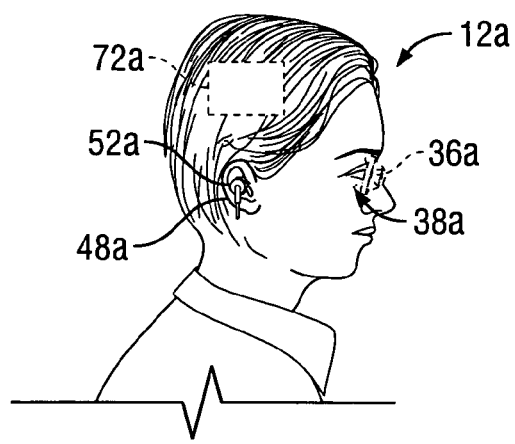
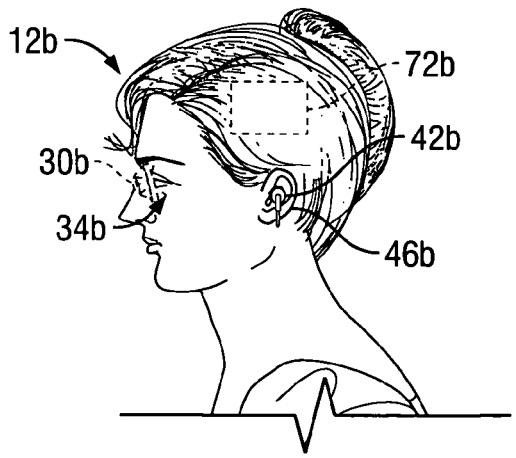
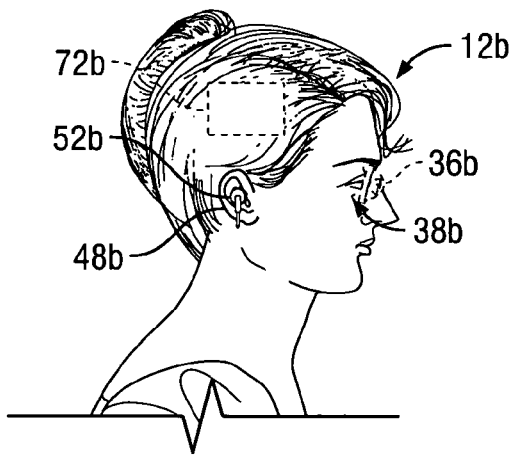
FIG. 2A                    FIG. 2B

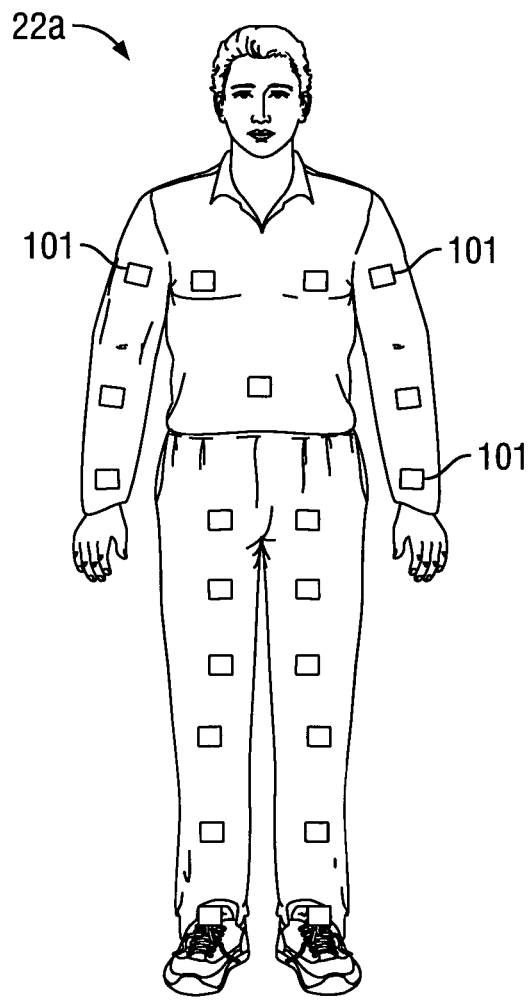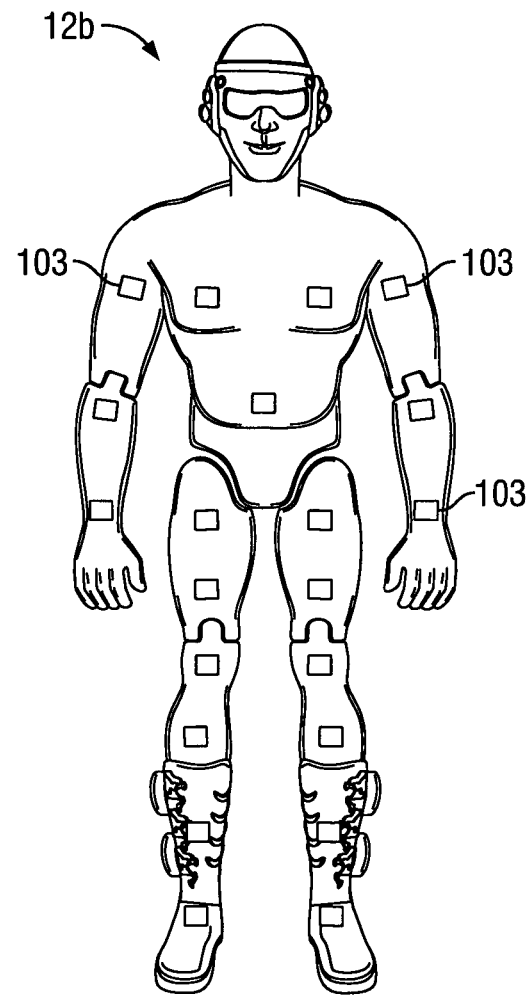
FIG. 7A  FIG. 7B

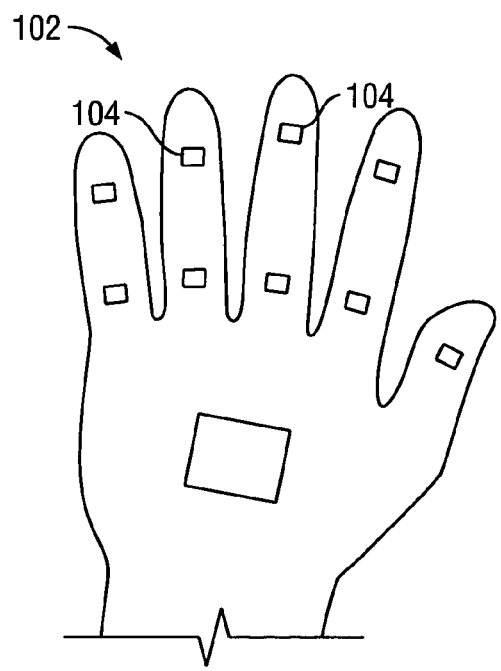
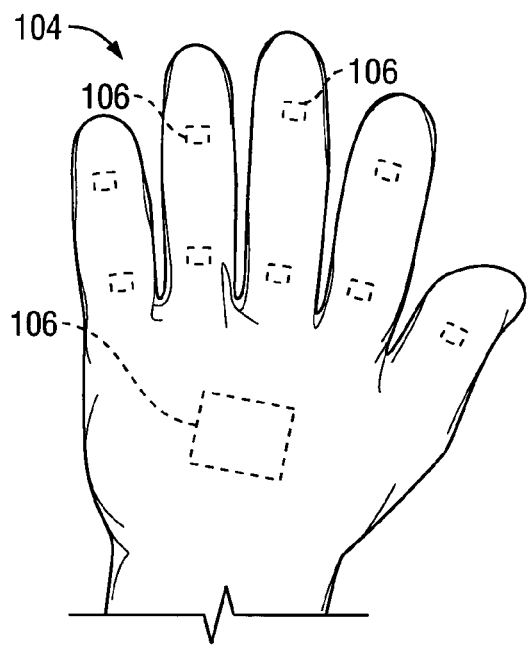
FIG. 8A  FIG. 8B

US 8,600,550 B2

VIRTUAL ENCOUNTERS

TECHNICAL FIELD

This disclosure relates to virtual reality devices, and in particular, using these devices for communication and contact.

BACKGROUND

Two people can be separated by thousands of miles or across a town. With the development of the telephone, two people can hear each other's voice, and, to each of them, the experience is as if the other person was right next to them. Other developments have increased the perception of physical closeness. For example, teleconferencing and Internet cameras allow two people to see each other as well as hear each other over long distances.

SUMMARY

In one aspect, the invention is a virtual reality encounter system that includes motion sensors positioned on a human user. The motion sensors send motion signals corresponding to movements of the user as detected by the motion sensors relative to a reference point. The motion signals are transmitted over a communications network. The system also includes a humanoid robot, receiving, from the communications network, the motion signals to induce movement of the robot according to movement of the human user.

In another aspect, the invention is a method having a virtual encounter. The method includes sending motion signals from motion sensors positioned on a human user. The motion signals correspond to movements of the human user as detected by the motion sensors relative to a reference point. The motion signals being transmitted over a communications network. The method also includes receiving, at a humanoid robot, the motion signals sent by the motion sensors and inducing a movement of the robot according to movement of the human user.

One or more of the aspects above have one or more of the following advantages. The virtual encounter system adds a higher level of perception that two people are in the same place. Aspects of the system allow two people to touch and to feel each other as well as manipulate objects in each other's environment. Thus, a business person can shake a client's hand from across an ocean. Parents on business trips can read to their children at home and put them to bed. People using the system while in two different locations can interact with each other in a virtual environment of their own selection, e.g., a beach or a mountaintop. People can change their physical appearance in the virtual environment so that they seem taller or thinner to the other person or become any entity of their own choosing.

DESCRIPTION OF THE DRAWINGS

FIG. 1 is a view of a virtual encounter system.
FIG. 2A is a view of a left side of a head of a mannequin.
FIG. 2B is a view of a right side of the head of the mannequin.
FIG. 7A is a view of a user with motion sensors.
FIG. 7B is a view of a robot with motion actuators.
FIG. 8A is a view of a left hand of the robot.
FIG. 8B is a view a left glove worn by the user.

DESCRIPTION

Figure 3:
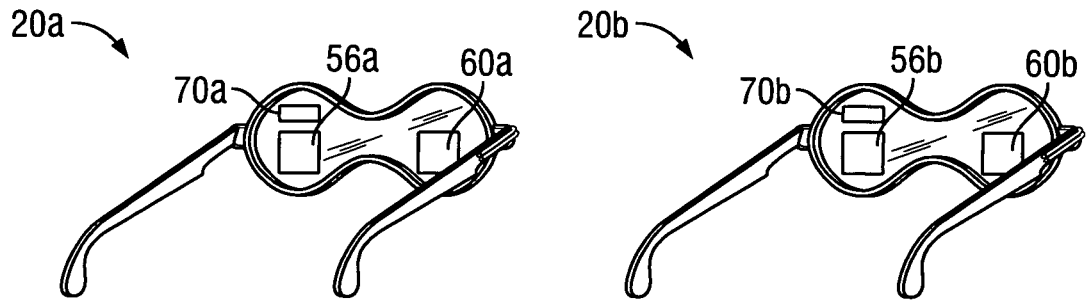
FIG. 3 is a view of a set of virtual glasses.

Referring to FIG. 1, a virtual encounter system 10 includes in a first location A, a mannequin 12a, a communication gateway 16a, a set of goggles 20a worn by a user 22a, and two wireless earphones (earphone 24a and earphone 26a) also worn by user 22a. System 10 can further include in a location B, a mannequin 12b, a communication gateway 16b, a set of goggles 20b worn by a user 22b, and two wireless earphones (earphone 24b and earphone 26b) also worn by user 22b. Gateway 16a and gateway 16b are connected by a network 24 (e.g., the Internet).

As will be explained below, when user 22a interacts with mannequin 12a in location A by seeing and hearing the mannequin, user 22a perceives seeing user 22b and hearing user 22b in location B. Likewise, user 22b listens and sees mannequin 12b but perceives listening and seeing user 22a in location A. Details of the gateways 16a and 16b are discussed below. Suffice it to say that the gateways 16a and 16b execute processes to process and transport raw data produced for instance when users 22a and 22b interact with respective mannequins 12a and 12b.

Referring to FIGS. 2A and 2B, each mannequin 12a-12b includes a camera (e.g., camera 30a and camera 30b) positioned in a left eye socket (e.g., left eye socket 34a and left eye socket 34b), and a camera (e.g., camera 36a and camera 36b) positioned in a right eye socket (e.g., right eye socket 38a and right eye socket 38b).

Each mannequin 12a-12b also includes a microphone (e.g., microphone 42a and microphone 42b) positioned within a left ear (e.g., left ear 46a and left ear 46b), and a microphone (e.g., microphone 48a and microphone 48b) positioned within a right ear (e.g., right ear 52a and right ear 52b).

Each mannequin 12a-12b further includes a transmitter (e.g., transmitter 72a and transmitter 72b) containing a battery (not shown). Transmitters 72a-72b send the audio and video signals from the cameras and the microphones to communication gateway 16a-16b.

Referring to FIG. 3, each set of goggles 20a and 20b includes one left display (left display 56a and left display 56b) and one right display (right display 60a and right display 60b). Each set of goggles 20a and 20b includes a receiver (e.g., receiver 70a and receiver 70b) containing a battery source (not shown). Receivers 70a-70b receive the audio and video signals transmitted from processors 16a-16b.

Figure 4:
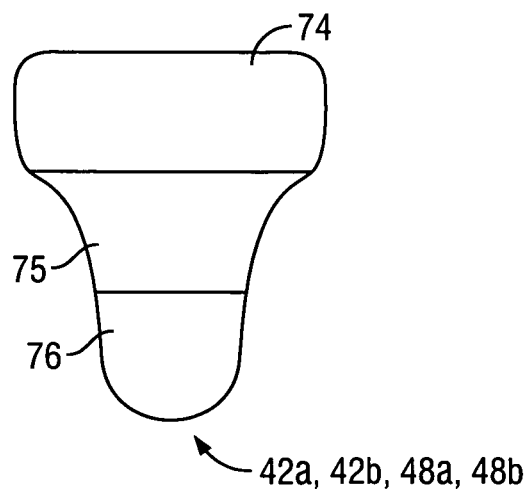
FIG. 4 is a view of a wireless earphone.

Referring to FIG. 4, each earphone 24a, 24b, 26a and 26b includes a receiver 74 for receiving audio signals from a corresponding microphone 42a, 42b, 48a and 48b an amplifier 75 for amplifying the audio signal and a transducer 76 for broadcasting audio signals.

Figure 5:
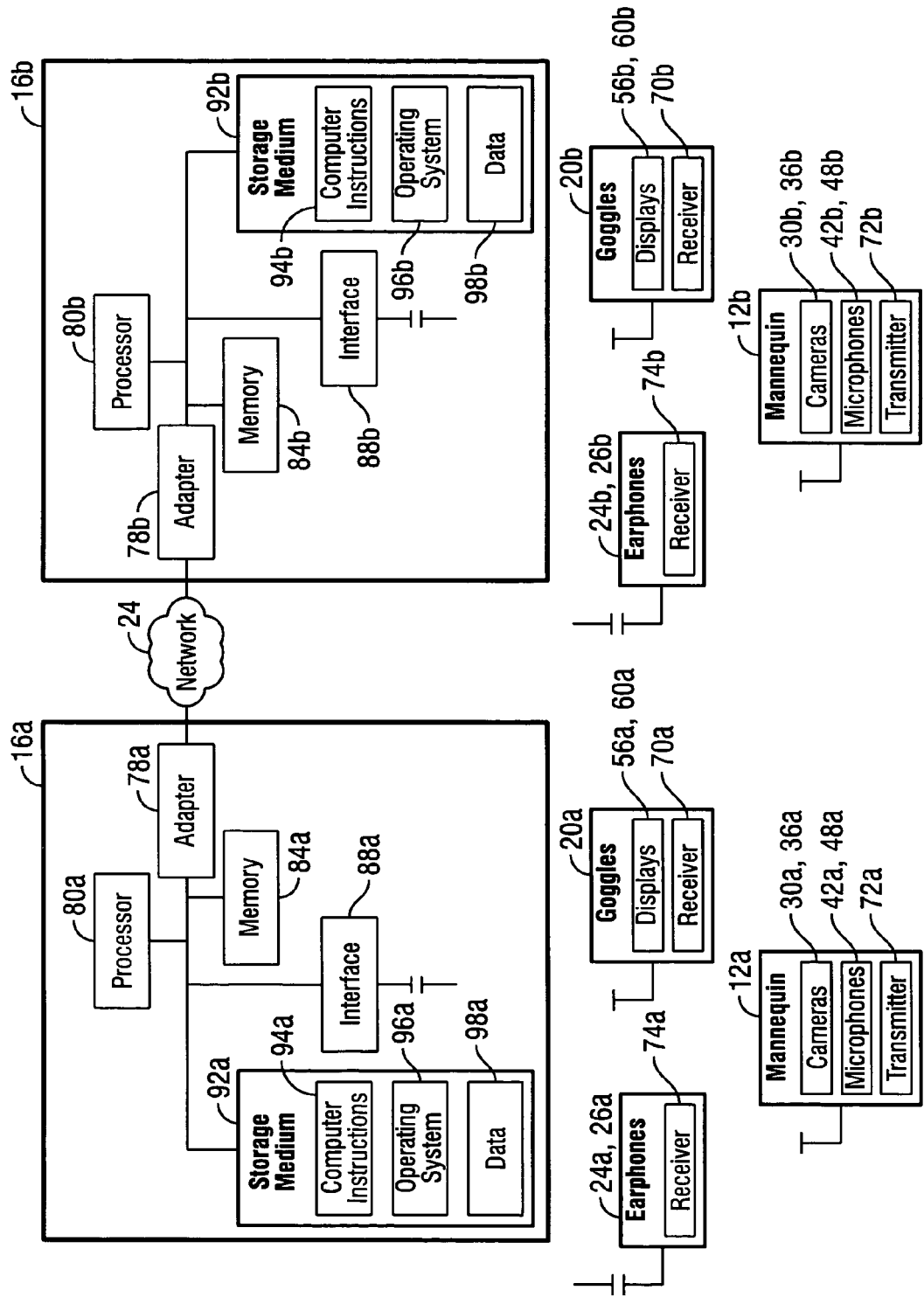
FIG. 5 is a functional diagram of the virtual encounter system.

Referring to FIG. 5, each communication gateway 16a-16b includes an adapter 78a-78b, a processor 80a-80b, memory 84a-84b, an interface 88a-88b and a storage medium 92a-92b (e.g., a hard disk). Each adapter 78a-78b establishes a bi-directional signal connection with network 24.

Each interface 88a-88b receives, via transmitter 72a-78b in mannequin 12a-12b, video signals from cameras 30a-30b, 36a-36b and audio signals from microphones 42a-42b, 48a-48b. Each interface 88a-88b sends video signals to displays 56a, 56b in goggles 20a-20b via receiver 70a-70b. Each interface 88a sends audio signals to earphones 24a-24b, 26a-26b in goggles 20a-20b via receiver 74a-74b.

Each storage medium 92a-92b stores an operating system 96a-96b, data 98a-98b for establishing communications links with other communication gateways, and computer instructions 94a-94b which are executed by processor 80a-80b in respective memories 84a-84b to coordinate, send and receive audio, visual and other sensory signals to and from network 24.

Signals within system 10 are sent using a standard streaming connection using time-stamped packets or a stream of bits over a continuous connection. Other examples, include using a direct connection such as an integrated services digital network (ISDN).

Figure 6:
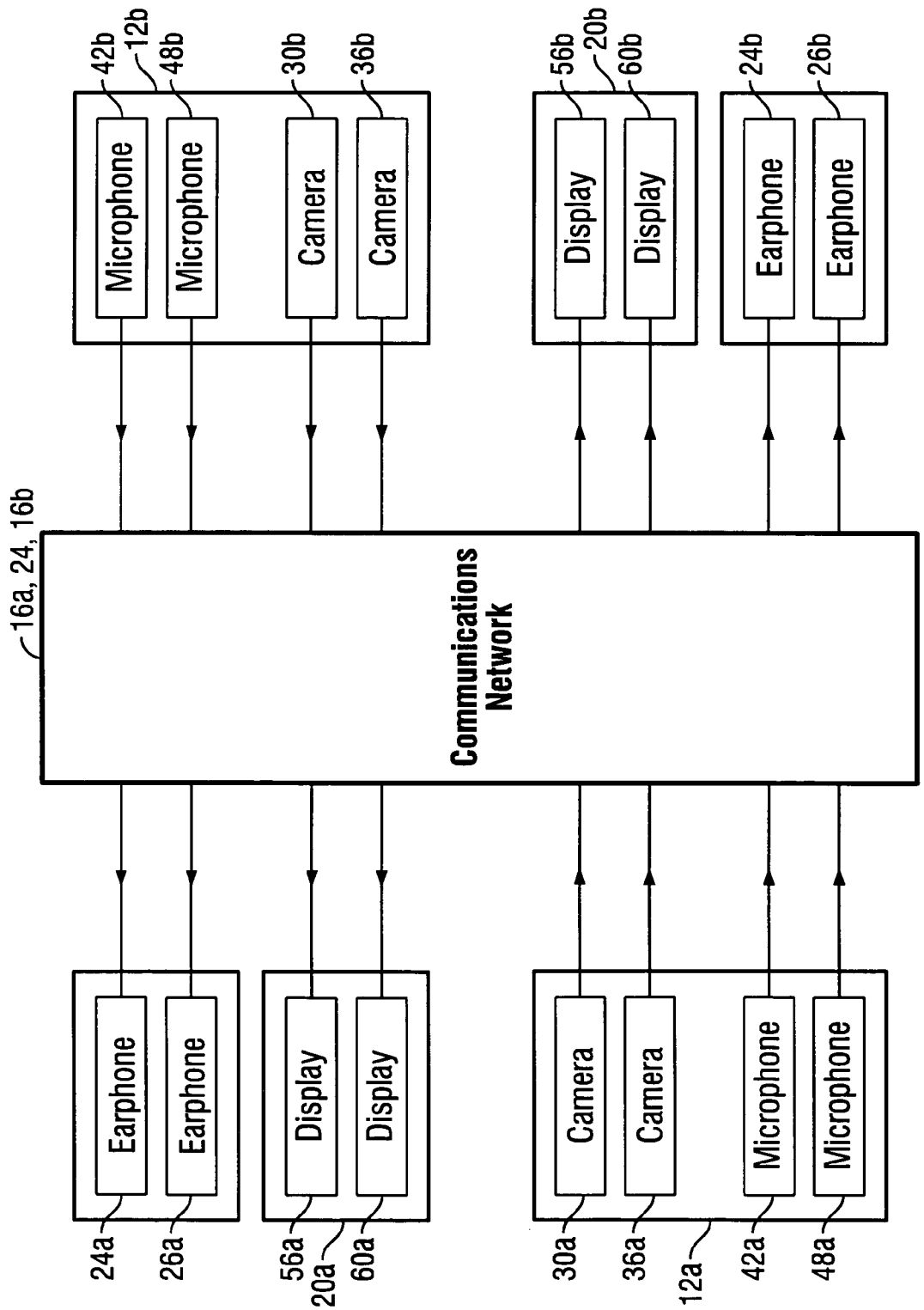
FIG. 6 is a signal flow diagram of the virtual encounter system.

Referring to FIG. 6, in operation, camera 30b and camera 36b record video images from Location B. The video images are transmitted wirelessly to communication gateway 16b as video signals. Communication gateway 16b sends the video signals through network 28 to communication gateway 16a. Communication gateway 16b transmits the video signals wirelessly to set of goggles 20a. The video images recorded by camera 30b are rendered on to display 56a, and the video images recorded on camera 36b are rendered on to display 60a.

Likewise, communication gateway 16a and communication gateway 16b work in the opposite direction through network 24, so that the video images, from location A, recorded by camera 30a are rendered on to display 56b. The video images, recorded by camera 36a are rendered on display 60b.

The sounds received by microphone 42a in location A, are transmitted to earphone 24b and sounds received in location A by microphone 52a are transmitted to earphone 26b. The sounds received by microphone 42b in location B, are transmitted to earphone 24a and sounds received in location B by microphone 52b are transmitted to earphone 26a.

Using system 10, two people can have a conversation where each of the persons perceives that the other is in the same location as them.

Referring to FIGS. 7A and 7B, the user 22a is shown wearing motion sensors 101, over portions of their bodies, and in particular over those portions of the body that exhibit movement. In addition, the mannequins are replaced by robots. For example, a robot 12b includes a series of motion actuators 103. Each motion actuator 103 placement corresponds to a motion sensor 101 on the user 22a so that each motion sensor activates a motion actuator in the robot that makes the corresponding movement.

For example, when the user 22a moves their right hand, a sensor in the right hand sends a signal through the network to a motion actuator on the robot. The robot 12b in turn moves its right hand.

In another example, a user 22a can walk towards a robot 12a in location A. All the sensors on the user 22a send a corresponding signal to the actuators on the robot 12b in location B. The robot 12b in location B performs the same walking movement. The user 22b in location B is not looking in location B but rather through the eyes of the robot 12a in location A so that user 22b does see the user 22a in location A walking towards them, but not because the robot 12b in location B is walking. However, the fact that the robot 12b in location B is walking enables two things to happen. First, since the user 22a in location A is seeing through the eyes of the robot 12b in location B and since the robot 12b in location B is walking enables the user 22a in location A to see what he would see if he were indeed walking in location B. Second, it enables the robot 12b in location B to meet up with the user 22b in location B.

Referring to FIGS. 8A and 8B, in still other embodiments, tactile sensors 104 are placed on the exterior of a robot hand 102 located in Location A. Corresponding tactile actuators 106 are sewn into an interior of a glove 104 worn by a user in location B. Using system 10, a user in location B can feel objects in Location A. For example, a user can see a vase within a room, walk over to the vase, and pick-up the vase. The tactile sensors-actuators are sensitive enough so that the user can feel the texture of the vase.

Figure 9A:
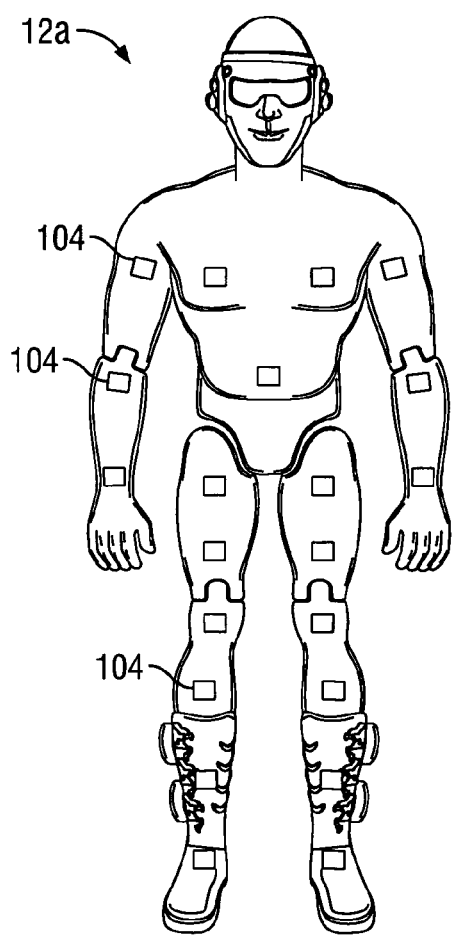
FIG. 9A is a view of a robot with tactile actuators.
Figure 9B:
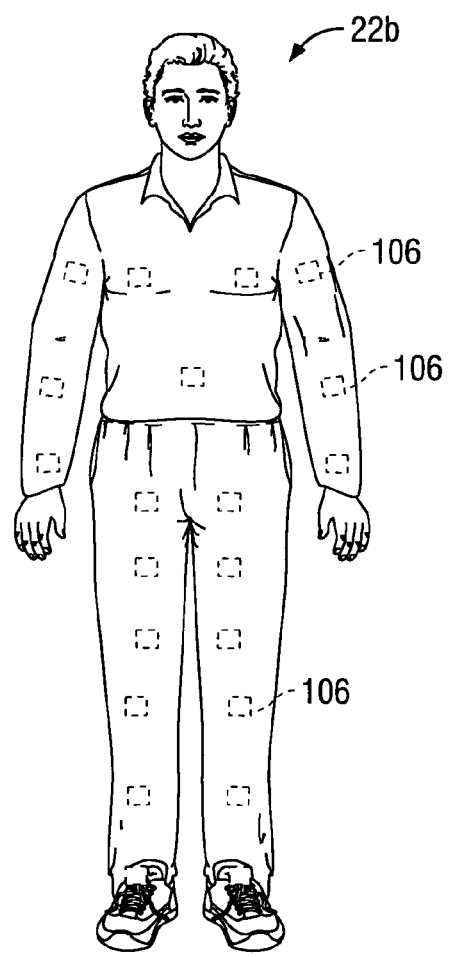
FIG. 9B is a view of the user with tactile sensors.

Referring to FIGS. 9A and 9B, in other embodiments, sensors are placed over various parts of a robot. Corresponding actuators can be sewn in the interior of a body suit that is worn by a user. The sensors and their corresponding actuators are calibrated so that more sensitive regions of a human are calibrated with a higher degree of sensitivity.

Figure 10A:
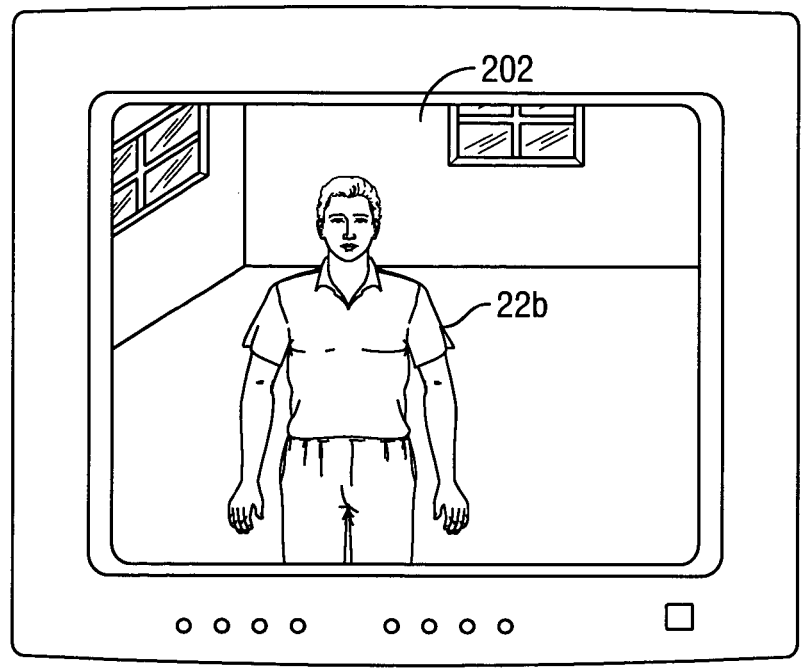
FIG. 10A is a view of a scene with the user in a room.
Figure 10B:
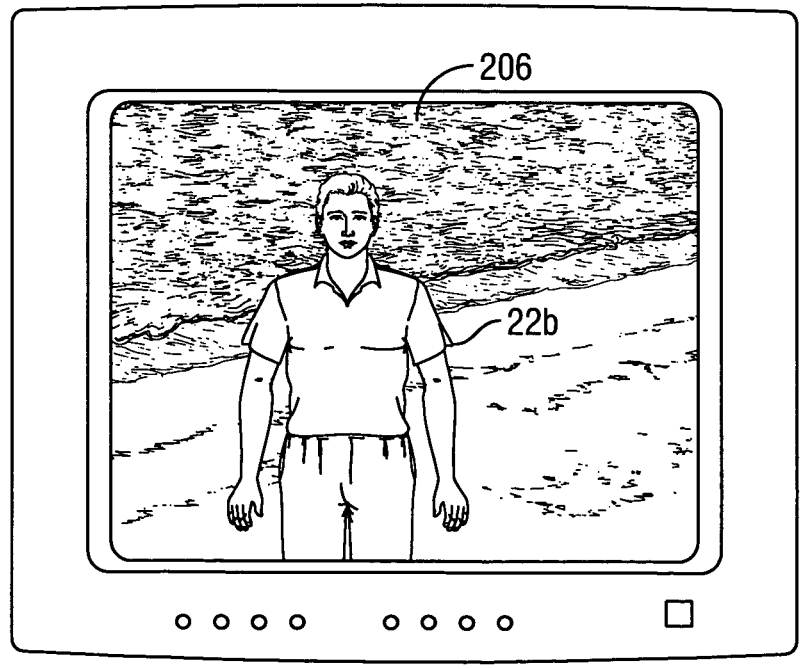
FIG. 10B is a view of the scene with the user on a beach.

Referring to FIGS. 10A and 10B in other embodiments, user 22a can receive an image of a user 22b but the actual background behind user 22b is altered. For example, user 22b is in a room 202 but user 22a perceives user 22b on a beach 206 or on a mountaintop (not shown). Using conventional video image editing techniques, the communication gateway 16a processes the signals received from Location B and removes or blanks-out the video image except for the portion that has the user 22b. For the blanked out areas on the image, the communication gateway 16a overlays a replacement background, e.g., virtual environment to have the user 22b appear to user 22a in a different environment. Generally, the system can be configured so that either user 22a or user 22b can control how the user 22b is perceived by the user 22a. Communication gateway 16a using conventional techniques can supplement the audio signals received with stored virtual sounds. For example, waves are added to a beach scene, or eagles screaming are added to a mountaintop scene.

In addition, gateway 16a can also supplement tactile sensations with stored virtual tactile sensations. For example, a user can feel the sand on her feet in the beach scene or a cold breeze on her cheeks in a mountain top scene.

In this embodiment, each storage medium 92a-92b stores data 98a-98b for generating a virtual environment including virtual visual images, virtual audio signals, and virtual tactile signals. Computer instructions 94a-94b, which are executed by processor 80a-80b out of memory 84a-84b, combine the visual, audio, and tactile signals received with the stored virtual visual, virtual audio and virtual tactile signals in data 98a-98b.

Figure 11A:
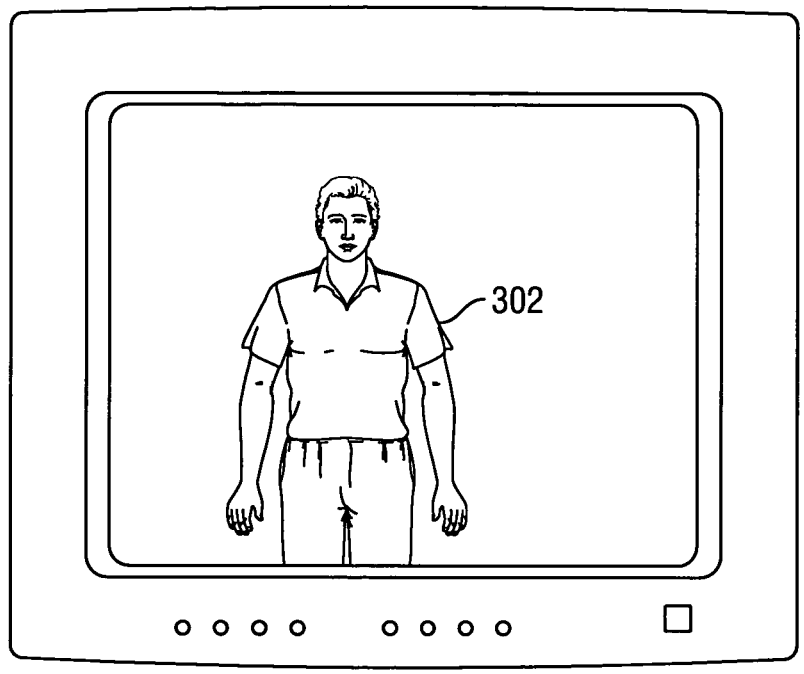
FIG. 11A is a view of an image of the user.
Figure 11B:
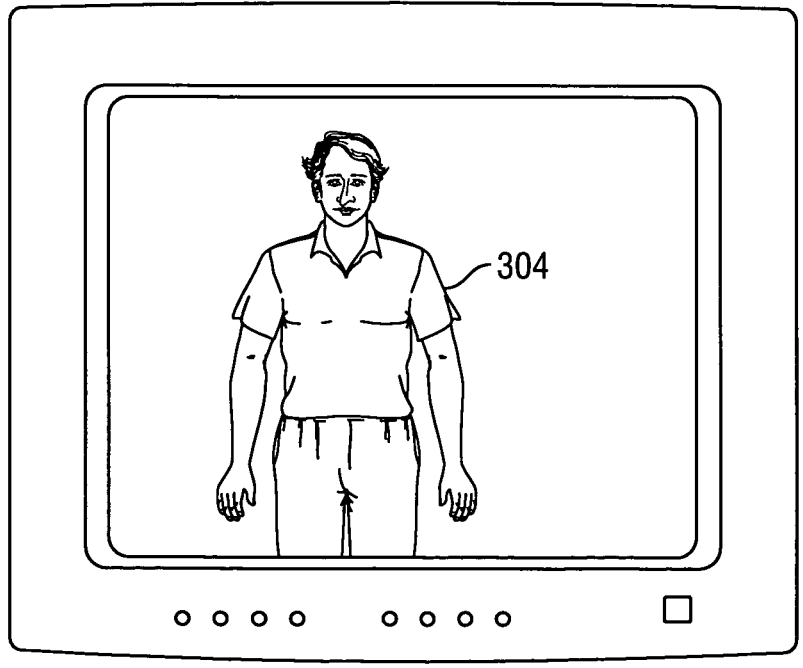
FIG. 11B is a view of a morphed image of the user.

Referring to FIGS. 11A and 11B, in other embodiments, a user 22a can receive a morphed image 304 of user 22b. For example, an image 302 of user 22b is transmitted through network 24 to communications gateway 16a. User 22b has brown hair, brown eyes and a large nose. Communications gateway 16a again using conventional imaging morphing techniques alters the image of user 22b so that user 22b has blond hair, blue eyes and a small noise and sends that image to goggles 20a to be rendered.

Communication gateway 16a also changes the sound user 22b makes as perceived by user 22a. For example, user 22b has a high-pitched squeaky voice. Communication gateway 22b using conventional techniques can alter the audio signal representing the voice of user 22b to be a low deep voice.

In addition, communication gateway 16a can alter the tactile sensation. For example, user 22b has cold, dry and scaling skin. Communications gateway 16a can alter the perception of user 22a by sending tactile signals that make the skin of user 22b seem smooth and soft.

In this embodiment, each storage medium 92a-92b stores data 98a-98b for generating a morph personality. Computer instructions 94a-94b, which are executed by processor 80a-80b out of memory 84a-84b, combine the visual, audio, and tactile signals received with the stored virtual visual, virtual audio and virtual tactile signals of a personality in data 98a-98b.

Thus using system 10 anyone can assume any other identity if it is stored in data 98a-98b.

In other embodiments, earphones are connected to the goggles. The goggles and the earphones are hooked by a cable to a port (not shown) on the communication gateway.

Other embodiments not described herein are also within the scope of the following claims.

What is claimed is:

1. A virtual reality encounter system comprising,
motion sensors positioned on a human user, the motion sensors sending motion signals corresponding to movements of the user, as detected by the motion sensors relative to a reference point, the motion signals sent over a communications network;
a set of goggles worn by the user, the goggles including a display to render video signals received from the communications network from at least one first camera; and
a first humanoid robot at a first location, receiving, from the communications network, the motion signals to induce movement of the first humanoid robot according to movement of the human user, the first humanoid robot further comprising:
the at least one first camera coupled to first humanoid robot, the first camera for sending video signals to the communications network for reception by the set of goggles, with the first humanoid robot having life-like features, and the first humanoid robot further comprising:
a body having a head portion with at least one eye socket, with the at least one first camera coupled to the head portion of the body in the at least one eye socket; and
a microphone coupled to the body, the microphone for sending audio signals to the communications network;
a transducer disposed in a headset worn by the user to transduce the audio signals received from the microphone;
wherein the first humanoid robot is at a first location, the user and the set of goggles are at a second, different location, the system further comprising:
a second humanoid robot in the second location, the second humanoid robot having a second microphone and at least one second camera for sending audio and video signals over the communication network;
a second set of goggles worn by a second user at the first location to receive the video signals from the first camera, via the communications network; and
a second transducer worn by the second user at the first location to receive the audio signals from the first microphone, via the communications network.

2. The system of claim 1, wherein the first humanoid robot includes actuators corresponding to the motion sensors, the actuators causing the first humanoid robot to move.

3. The system of claim 1, wherein the second humanoid robot has life-like features, the second humanoid robot comprises:
a body, the body having a head portion with at least one eye socket; and with the at least one camera coupled to the head portion of the body in the at least one eye socket.

4. The system of claim 3, further comprising:
a microphone coupled to the body of the second humanoid robot, the microphone for sending audio signals to the communications network; and
a transducer disposed in a headset worn by the user, to transduce the audio signals received from the microphone.

5. The system of claim 4, wherein the second transducer is a earphone worn by the second user at the first location to receive the audio signals from the first microphone, via the communications network.

6. The system of claim 4, wherein the body of the second humanoid robot includes an eye socket and the camera is positioned in the eye socket.

7. The system of claim 4, wherein the body of the second humanoid robot includes an ear canal and the microphone is positioned within the ear canal.

8. The system of claim 7, wherein each of the first and the second set of goggles, comprises a receiver to receive the video signals.

9. The system of claim 4, wherein the each of the first and second humanoid robots, comprise a transmitter to wirelessly send the audio signals, motion signals and the video signals to the communications network.

10. The system of claim 1, wherein the communications network comprises:
a first communication gateway in the first location; and
a second communication gateway in the second location, the second gateway connected to the first gateway via the communications network.

11. The system of claim 10 wherein each gateway further comprises:
an interface coupled to the communications network, the interface having one or more channels for:
receiving audio signals from a corresponding one of the first and second microphones;
receiving video signals from a corresponding one of the first and second cameras;
sending audio signals to a corresponding one of the first and second sets of goggles; and
sending audio signals to a corresponding one of the first and second transducers.

12. The system of claim 1, further comprising:
a first communication gateway in the first location the first communication gateway further comprising:
a computing device that receives the motion signals and transmits the motion signals over the communications network.

13. A method of having a virtual encounter, comprising:
receiving, by a humanoid robot at a first location, motion signals sent by motion sensors over a communications network;
sending the motion signals from motion sensors that are positioned on a human user at a second location, the motion signals corresponding to movements of the human user as detected by the motion sensors relative to a reference point, the motion signals being transmitted over the communications network;
sending over the communication network first video signals captured by a first camera positioned on the humanoid robot;
receiving the first video signals from the first camera over the communications network, with receiving using a first set of goggles worn by the user at the second location, the first set of goggles including a display to render the received first video signals from the first camera;

sending over the communications network first audio signals, the first audio signals being produced from a microphone coupled to the humanoid robot;

transducing the first audio signals received from the communications network using a transducer at the second location;

inducing a movement of the humanoid robot according to movement of the human user;

sending second audio signals to the communications network from a second microphone coupled to a second robot at the second location, the second robot having life-like features;

sending second video signals to the communications network from a second camera coupled to the second robot;

rendering the second video signals received from the communications network using a second set of goggles worn by a second user at the first location; and transducing the second audio signals received from the communications network using a second transducer on the second user at the first location.

14. The method of claim 13, wherein receiving motion signals comprises receiving motion signals at corresponding actuators coupled to the humanoid robot, with the actuators causing the humanoid robot to move.

15. The method of claim 13 wherein transducing the first audio signals uses the transducer in a headset worn by the first user at the second location.

16. The method of claim 15, wherein the humanoid robot is a first humanoid robot and the robot at the second location is a second humanoid robot and wherein the first and the second humanoid robots each comprise:
a body having a head portion with at least one eye socket, with the at least one camera coupled to the head portion of the body in the at least one eye socket; and
a microphone coupled to the body, the microphone for sending audio signals to the communications network.

17. The method of claim 15, wherein at least one of the humanoid robot and the robot include an eye socket and the respective one of the first and second cameras is positioned in the eye socket.

18. The method of claim 15, wherein at least one of the humanoid robot and the robot include an ear canal and respective one has the microphone positioned within the ear canal.

19. The method of claim 15, wherein the set of goggles, comprises a receiver to receive the video signals.

20. The method of claim 15, wherein at least one of the humanoid robot and the robot further comprises a transmitter to wirelessly send the audio signals, the motion signals and the video signals to the communications network.

21. A virtual reality encounter system comprising,
motion sensors positioned on a human user, the motion sensors sending motion signals corresponding to movements of the user, as detected by the motion sensors relative to a reference point, the motion signals sent over a communications network;
a set of goggles worn by the user, the goggles including a display to render video signals received from the communications network from at least one camera; and
a humanoid robot at a first location, receiving, from the communications network, the motion signals to induce movement of the humanoid robot according to movement of the human user, the humanoid robot further comprising:
the at least one camera coupled to humanoid robot, the camera for sending video signals to the communications network for reception by the set of goggles, with the humanoid robot having life-like features, and the first humanoid robot further comprising:
a body having a head portion with at least one eye socket, with the at least one first camera coupled to the head portion of the body in the at least one eye socket; and
a microphone coupled to the body, the microphone for sending audio signals to the communications network;
a transducer disposed in a headset worn by the user to transduce the audio signals received from the microphone.

22. The system of claim 21, wherein the humanoid robot includes actuators corresponding to the motion sensors, the actuators causing the humanoid robot to move.

23. The system of claim 21, further comprising:
a gateway device; and
an interface coupled to the communications network, the interface having one or more channels for:
receiving the audio signals from the microphone;
receiving the video signals from the camera;
sending the audio signals to the set of goggles; and
sending the audio signals to the transducer.

24. The system of claim 21, wherein the body of the humanoid robot includes an eye socket and the camera is positioned in the eye socket, an ear canal and the microphone is positioned within the ear canal; and the set of goggles, comprises a receiver to receive the video signals.

25. The system of claim 21, wherein the humanoid robot, comprises a transmitter to wirelessly send the audio signals, motion signals and the video signals to the communications network.

26. A method of having a virtual encounter, comprising:
sending motion signals from motion sensors positioned on a human user, the motion signals corresponding to movements of the human user as detected by the motion sensors relative to a reference point, the motion signals being transmitted over a communications network;
receiving video signals from a camera via the communications network, with receiving using a set of goggles worn by the user, the goggles including a display to render the received video signals from the camera;
receiving, at a humanoid robot, the motion signals sent by the motion sensors, via the communications network;
sending video signals received from the camera positioned on the humanoid robot to the goggles, via the communication network;
sending audio signals over the communications network, the audio signals being produced from a microphone coupled to the robot;
transducing the audio signals received from the communications network using a transducer; and
inducing a movement of the robot according to movement of the human user.

27. The method of claim 26, wherein receiving comprises receiving signals from the motion sensors at corresponding actuators coupled to the robot, causing a movement comprises the actuators causing the robot to move.

28. The method of claim 26, wherein the robot is at a first location and the set of goggles is at a second location and the method further comprises:
sending audio signals to the communications network from a second microphone coupled to a second robot at the first location, the second robot having life-like features;
sending video signals to the communications network from a second camera coupled to the second robot having life-like features;

rendering the video signals received from the communications network onto a monitor coupled to a second set of goggles worn by a user at the first location; and transducing the audio signals received from the communications network using a second transducer on the user at the first location.

29. The method of claim 26, wherein the robot includes an eye socket and the camera is positioned in the eye socket, an ear canal and the microphone is within the ear canal.

* * * * *